(12) United States Patent
Nakamura et al.

(10) Patent No.: US 8,039,133 B2
(45) Date of Patent: Oct. 18, 2011

(54) MAGNETIC RECORDING MEDIUM AND METHOD FOR MANUFACTURING THE SAME

(75) Inventors: Miyabi Nakamura, Ibaragi (JP); Takahiro Shimizu, Nagano (JP); Hiroyuki Uwazumi, Nagano (JP); Naoki Takizawa, Nagano (JP); Tadaaki Oikawa, Nagano (JP)

(73) Assignee: Fuji Electric Device Technology Co., Ltd. (JP)

(*) Notice: Subject to any disclaimer, the term of this patent is extended or adjusted under 35 U.S.C. 154(b) by 1694 days.

(21) Appl. No.: 11/114,578

(22) Filed: Apr. 26, 2005

(65) Prior Publication Data

US 2005/0196642 A1 Sep. 8, 2005

Related U.S. Application Data

(62) Division of application No. 10/317,017, filed on Dec. 11, 2002, now Pat. No. 6,899,964.

(30) Foreign Application Priority Data

Dec. 11, 2001 (JP) ................................. 2001-377774

(51) Int. Cl.
*G11B 5/66* (2006.01)
(52) U.S. Cl. .................................................... 428/836.2
(58) Field of Classification Search ............... 428/836.2, 428/836.3
See application file for complete search history.

(56) References Cited

U.S. PATENT DOCUMENTS

| 4,610,911 | A | 9/1986 | Opfer et al. |
|---|---|---|---|
| 5,004,652 | A | 4/1991 | Lal et al. |
| 5,652,054 | A * | 7/1997 | Kikitsu et al. ............... 428/328 |
| 5,679,473 | A | 10/1997 | Murayama et al. |
| 5,919,581 | A | 7/1999 | Yamamoto et al. |
| 6,129,981 | A | 10/2000 | Okuyama et al. |
| 6,420,058 | B1 | 7/2002 | Haratani et al. |
| 6,620,532 | B2 | 9/2003 | Aoyama |
| 6,667,116 | B1 * | 12/2003 | Uwazumi et al. ............ 428/832 |
| 6,689,495 | B1 | 2/2004 | Sato et al. |
| 6,899,964 | B2 * | 5/2005 | Nakamura et al. ......... 428/832.1 |

FOREIGN PATENT DOCUMENTS

| JP | 8-83418 A | 3/1996 |
|---|---|---|
| JP | 2000-322726 A | 11/2000 |

OTHER PUBLICATIONS

Notification of Reasons for Refusal, mailed on Aug. 12, 2005, in the corresponding Japanese Application No. 2001-377774.
Relevant portions of the Search Report from the Australian Patent Office, mailed on Jul. 8, 2005, for corresponding Singapore Application No. SG 200207472-2.
Written Opinion, mailed on Jul. 8, 2005, for corresponding Singapore Application No. SG 200207472-2.

* cited by examiner

*Primary Examiner* — Holly Rickman
(74) *Attorney, Agent, or Firm* — Rossi, Kimms & McDowell LLP

(57) ABSTRACT

A magnetic recording medium, and method of manufacturing the same, is provided with excellent recording performance by employing a granular magnetic layer having a specified composition. A magnetic recording medium according to the present invention comprises a nonmagnetic underlayer, a granular magnetic layer, a protective film, and a liquid lubrication layer sequentially laminated on a nonmagnetic substrate. The granular magnetic layer consists of ferromagnetic crystal grains containing cobalt and nonmagnetic grain boundary region surrounding the ferromagnetic crystal grains. The ferromagnetic crystal grains contain platinum in the range of 15 at % to 17 at %.

3 Claims, 2 Drawing Sheets

MAGNETIC RECORDING MEDIUM AND METHOD FOR MANUFACTURING THE SAME

CROSS-REFERENCE TO RELATED APPLICATION

This application is a divisional of U.S. application Ser. No. 10/317,017 filed on Dec. 11, 2002

BACKGROUND

The present invention relates to a magnetic recording medium mounted on a variety of magnetic recording devices such as an external memory device of a computer. The invention also relates to a method for manufacturing such a medium.

Remarkable technology development of magnetic recording devices in recent years is pushing for magnetic recording media with higher coercive force and lower noises. For addressing such demands, various proposals have been made concerning compositions and structure of a magnetic layer and materials of a nonmagnetic underlayer.

Recently, a magnetic layer has been proposed having a structure in which ferromagnetic crystal grains are surrounded by nonmagnetic and nonmetallic substance, such as an oxide. Such a magnetic layer is generally called "a granular magnetic layer". The granular magnetic layer is considered that interaction between the ferromagnetic crystal grains is decreased because the individual ferromagnetic crystal grain is physically separated by the nonmagnetic and nonmetallic grain boundary phase.

U.S. Pat. No. 5,679,473 discloses that a magnetic recording medium having a granular magnetic layer exhibits high coercive force and low noises. The granular magnetic layer in this reference was formed by RF sputtering using a target of an alloy of CoPt system incorporating an oxide such as $SiO_2$. The reference, U.S. Pat. No. 5,679,473, also discloses the diameter of the crystal grains constituting the granular magnetic layer, the distance between the crystal grains, and macroscopic composition of the granular magnetic layer. The granular magnetic layer as disclosed does not need substrate heating for controlling crystal structure. Consequently, the granular magnetic layer has advantages of superior productivity and possibility of forming on an inexpensive nonmagnetic substrate made of plastic, for example.

In order to obtain a magnetic recording medium with excellent recording performances using the granular magnetic layer, it is necessary to increase coercive force and anisotropic magnetic field, and also necessary to suppress interaction between the crystal grains in the magnetic layer by enhancing magnetic isolation of each crystal grain. Thus, when a granular magnetic layer is deposited using a target containing an oxide such as $SiO_2$ and a ferromagnetic alloy such as cobalt alloy, the oxide and the ferromagnetic alloy composing the target are desired to be well separated to one another in the deposited magnetic film. Consequently, the target and its material must be appropriately selected so that the ferromagnetic crystal grains made of the ferromagnetic alloy and the grain boundary region made of the oxide are well separated after deposition by sputtering.

Various sputtering methods that are conducted in an argon gas atmosphere are known among generally employed deposition techniques. In most sputtering methods, the impact of the argon ions in plasma at the collision with the target readily causes decomposition of the oxide such as $SiO_2$. The silicon atoms liberated by decomposition of $SiO_2$ readily diffuse into the ferromagnetic alloy such as cobalt base alloy and are liable to cause degradation of magnetic characteristics. Thus, the composition of the actually deposited magnetic layer is often different from the composition of the target supplied for sputtering. If the same target is used, but the sputtering is conducted under a different condition, then the composition of the deposited magnetic layer possibly changes.

As described above, even if a suitable target is selected, the target can not necessarily achieve its full ability when the target is deposited as a magnetic layer. In order to adequately control the granular magnetic layer, it is essential to control the composition of the magnetic layer resulted by deposition process. Nevertheless, such a guideline has not elucidated yet.

Accordingly, it would be desirable to provide a magnetic recording medium with excellent magnetic and magnetic conversion characteristics by using a granular magnetic layer having a specified composition, and a method for manufacturing such a medium.

SUMMARY OF THE INVENTION

The inventors of the present invention have made extensive studies to solve the problems and found that excellent magnetic performance can be obtained when a specified amount of platinum exists in each of the ferromagnetic crystal grain and the grain boundary region of the granular magnetic layer containing a cobalt alloy. A magnetic recording medium constituted by employing such a granular magnetic layer accomplishes excellent recording performances, that is, high coercive force and low noise of the magnetic recording medium.

A magnetic recording medium according to the present invention comprises at least a nonmagnetic underlayer, a granular magnetic layer, a protective film, and a liquid lubrication layer sequentially laminated on a nonmagnetic substrate. The granular magnetic layer consists of ferromagnetic crystal grains containing cobalt and grain boundary region surrounding the ferromagnetic crystal grains. The ferromagnetic crystal grain contains 15 at % to 17 at % of platinum.

Advantageously, the nonmagnetic grain boundary region includes an oxide of silicon. The nonmagnetic grain boundary region preferably further includes one or more oxides or nitrides of an element selected from Cr, Co, Al, Ti, Ta, Zr, Ce, Y, and Hf.

Advantageously, the nonmagnetic grain boundary region contains 1 at % to 10 at % of platinum.

A ratio of the silicon content to the platinum content in the nonmagnetic grain boundary region is preferably at least 6 in an atomic ratio.

Advantageously, the nonmagnetic substrate is a plastic substrate.

A method according to the present invention for manufacturing a magnetic recording medium manufactures the magnetic recording medium described above and comprises steps of sequentially laminating at least a nonmagnetic underlayer, a magnetic layer, a protective layer, and a liquid lubrication layer. The laminating steps are conducted without preheating the nonmagnetic substrate.

Advantageously, the step of laminating the magnetic layer is conducted by means of an RF sputtering method using a target composed of a mixture including $SiO_2$ and a ferromagnetic material containing at least cobalt and platinum, under a pressure in the range of 5 mTorr to 30 mTorr.

BRIEF DESCRIPTION OF DRAWINGS

The invention will be described in greater with reference to the following detailed description of the preferred embodiments of the invention along with the accompanying drawings, wherein.

DETAILED DESCRIPTION OF THE PREFERRED EMBODIMENTS OF THE INVENTION

Figure 1:
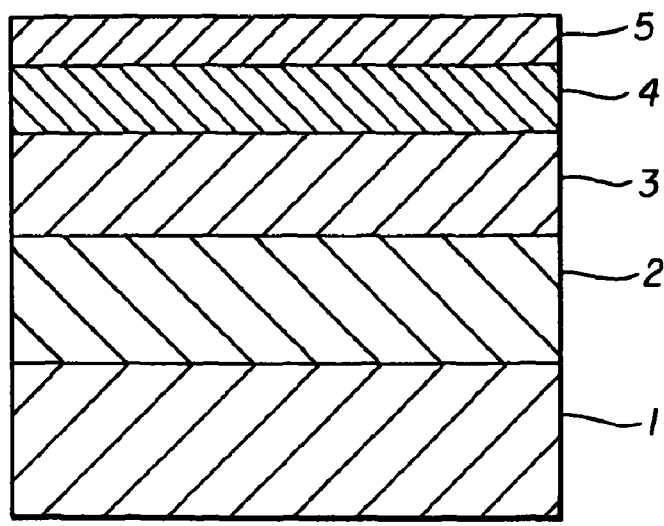
FIG. 1 is a schematic cross-sectional view of an example of embodiment of a magnetic recording medium according to the present invention.

A first aspect of the present invention is a magnetic recording medium. FIG. 1 is a schematic cross-sectional view of an example of a magnetic recording medium according to the present invention. As shown in FIG. 1, the magnetic recording medium has a structure in which a nonmagnetic underlayer 2, a granular magnetic layer 3, and a protective film 4 are sequentially formed on a nonmagnetic substrate 1, and a liquid lubrication layer 5 is formed on the protective film 4.

The magnetic layer in a magnetic recording medium according to the present invention is a granular magnetic layer that consists of ferromagnetic crystal grains composed of a cobalt alloy and nonmagnetic grain boundary region surrounding the grains. The ferromagnetic crystal grains contain 15 at % to 17 at % of platinum.

The ferromagnetic crystal grains contain at least cobalt and platinum and are composed of an alloy of CoPt system, for example. The CoPt alloy is not limited to a special alloy. The CoPt alloy may further contain one or more elements selected from the group consisting of Cr, Ni, and Ta. The nonmagnetic grain boundary region surrounding the ferromagnetic crystal grains contains at least an oxide of silicon, namely $SiO_2$. The nonmagnetic grain boundary region may further contain one or more oxides or nitrides of an element selected from Cr, Co, Al, Ti, Ta, Zr, Ce, Y, and Hf. Namely, the oxide may be selected from a group consisting of $SiO_2$, $Cr_2O_3$, CoO, $Al_2O_3$, $TiO_2$, $Ta_2O_5$, $ZrO_2$, and $HfO_2$. The nitride may be selected from a group consisting of SiN, TiN, and AlN. To stably maintain the granular structure, the oxides are preferable to the nitrides.

As stated before, the ferromagnetic crystal grains need to contain 15 at % to 17 at % of platinum to accomplish a magnetic recording medium with high coercive force. That amount of platinum contained in the ferromagnetic crystal grains also produces high anisotropic magnetic field. Platinum content in the crystal grains of less than 15 at % cannot produce high coercive force and high anisotropic magnetic field that can address high recording density. In addition, separation of crystal grains in the magnetic layer would be insufficient, resulting in increase of noises. On the other hand, if platinum content in the crystal grains exceeds 17 at %, the platinum cannot stably remain within the crystal grain and tends to segregate to the grain boundary. As a result, isolation of the crystal grain is hindered causing deterioration of recording performances. Moreover, increase of platinum contained in a target would cause higher cost.

High coercive force and low noise of a magnetic recording medium require magnetic isolation of the ferromagnetic crystal grains and reduction in magnetic interaction between crystal grains controlling platinum quantity in the ferromagnetic crystal grains. For this purpose, separation of the ferromagnetic crystal grains of cobalt alloy from the grain boundary region has to be promoted by segregating oxides or nitrides to the grain boundary region.

Most of the platinum in a target is desired to be deposited as a portion of the ferromagnetic crystal grain for achieving higher magnetic performance. However, the actual nonmagnetic grain boundary region of the magnetic layer also includes platinum. The inventors of the present invention found that a suitable quantity of platinum contained in each of the crystal grain and grain boundary region improves magnetic performance. It may be assumed that a suitable amount of platinum existing in the grain boundary region functions as a catalyst at the interface of outside and inside of the crystal grain during the sputtering process and retain the oxide or the nitride stably within the grain boundary. Accordingly, the existence of a suitable quantity of platinum in the grain boundary region is desired for accomplishing superior structure of the granular magnetic layer. Measuring the quantity of platinum existing in the grain boundary region is difficult because the grain boundary is narrow and the measured values scatter. Consequently, exact determination of the platinum quantity is a hard task. However, taking a large number of measured data and target compositions into account, it can be stated that the quantity of platinum existing in the grain boundary region is preferably in the range of 1 to 10 at %, more preferably about 5 at %, with respect to the composition of the grain boundary region. If the quantity of platinum existing in the grain boundary region is less than 1 at %, oxidation of silicon is insufficient and the oxide is hard to stably remain in the grain boundary region, generating unstable silicon. This causes deterioration of magnetic performances, increase of noises induced by inter-grain interaction that is accompanied by poor separation between the magnetic grains, and lowering of thermal stability. On the other hand, if the quantity of platinum existing in the grain boundary region exceeds 10 at %, the platinum content in the magnetic grains and the platinum content in the grain boundary region become substantially the same. Namely, the platinum is distributed uniformly in the whole magnetic layer. Thus, amount of platinum that exists stably in the ferromagnetic crystal grains decreases, which causes deterioration of recording performances.

In order to accomplish superior recording performances, the atomic ratio Si/Pt is preferably at least 6, wherein the atomic ratio Si/Pt is equal to the ratio of the atomic percent of silicon to the atomic percent of platinum in the grain boundary region. If the atomic ratio Si/Pt is less than 6, segregation of the nonmagnetic substance is insufficient. Since the amount of platinum existing in the magnetic grains is relatively reduced, deterioration of recording performance may occur.

As described previously, high coercive force of a magnetic recording medium is attained when the ferromagnetic crystal grains of a cobalt alloy contains 15 at % to 17 at % of platinum in the crystal grains in the granular magnetic layer constituting the medium. A superior granular structure is achieved in which the grain boundary region is segregated and separated well from the cobalt alloy in the magnetic layer, when 1 at % to 10 at % of platinum is contained in the grain boundary region and the atomic ratio Si/Pt in the grain boundary region is at least 6. Thus, a magnetic recording medium with excellent magnetic performances is obtained by employing a granular magnetic layer in which the magnetic crystal grains and the grain boundary region contain respective specified amount of platinum.

A magnetic recording medium of the invention comprises such a granular magnetic layer as described above. The other components than the granular magnetic layer are by no means limited to any special forms. Major components of a magnetic recording medium will be briefly described below with reference to FIG. 1.

A nonmagnetic substrate 1 can be composed of a NiP-plated aluminum alloy, strengthened glass, or crystallized glass, which is used in a usual magnetic recording medium. Since forming a granular magnetic layer does not need substrate heating, an inexpensive substrate made by injection molding polycarbonate, polyolefin, or another resin can be used as well.

Any suitable material can be used for the nonmagnetic underlayer 2 so far as the material allows controlling fine structure of the magnetic layer including crystal alignment, grain size, and grain boundary segregation. The suitable material includes, for example, chromium and a chromium-based alloy that are used in a conventional magnetic recording medium. In addition, the metals of Ru, Os, and Re and the alloys based on these metals can also be used. Such metals and alloys have remarkable effect on the granular magnetic layer. The thickness of the nonmagnetic underlayer is selected from the necessary and sufficient thicknesses considering the effect to control the structure of the granular magnetic layer, productivity, and cost, although not limited to a special value.

The protective film 4 can be composed of a thin film of substantially carbon that is deposited by means of a sputtering method or a CVD method, for example. The liquid lubrication layer 5 can be composed of perfluoropolyether lubricant, for example.

Although a magnetic recording medium of the invention has been described with reference to FIG. 1, a magnetic recording medium of the invention shall not be limited to the above-described structure, but a seed layer, an intermediate layer and other layer may be appropriately added. For the purpose of controlling crystal alignment or other structure of the nonmagnetic underlayer or the granular magnetic layer, a seed layer may be provided between the nonmagnetic substrate and the nonmagnetic underlayer; and a nonmagnetic intermediate layer may be provided between the nonmagnetic underlayer and the granular magnetic layer. Addition of such layers also preserves the effects of the invention, or moreover, brings about superior performances.

The second aspect of the invention is a method for manufacturing a magnetic recording medium that is described above. The method of the invention comprises steps of sequentially laminating at least a nonmagnetic underlayer, a magnetic layer, a protective film, and a liquid lubrication layer on a nonmagnetic substrate, wherein the laminating steps are conducted without a step of preheating the nonmagnetic substrate.

The step of laminating the magnetic layer is conducted by means of a sputtering method using a target composed of a mixture including a ferromagnetic material containing at least cobalt and platinum, and an oxide of silicon. The composition of the target and the deposition conditions are suitably selected so that the deposited granular magnetic layer has the specified composition and structure.

For controlling the structure of the granular magnetic layer, the deposition of the layer is preferably conducted by means of an RF sputtering method under a pressure in the range of 5 mTorr to 30 mTorr. If the pressure of the deposition atmosphere is lower than 5 mTorr, formation of the granular structure is hindered because of deterioration of crystal alignment due to an initial growth layer and insufficient separation of the crystal grains, causing deterioration of a variety of characteristics. On the other hand, if the pressure is higher than 30 mTorr, lattice defects increases and crystal alignment is disturbed, causing deterioration of recording performances, and besides, brings upon lowering of reliability such as cobalt corrosion.

For depositing the granular magnetic layer, a target of a CoCrPt alloy containing an oxide including $SiO_2$, for example, can be preferably used. A suitable proportion of the oxide contained in the target is appropriately selected depending on the composition of the target and the deposition conditions. A target used for depositing the magnetic layer, however, is not restricted so far as the target achieves the specified composition in the granular magnetic layer.

A method for manufacturing a magnetic recording medium according to the invention accomplishes a magnetic recording medium with high Hc and low media noise even if a step of substrate heating is omitted, which step has been essential in most of conventional methods. Thus, the method of the invention can reduce manufacturing costs by virtue of simplification of the manufacturing process. Since the substrate heating is unnecessary in the manufacturing method of the invention, an inexpensive plastic substrate made of polycarbonate, polyolefin, or other resins can be used as well as a conventional aluminum substrate and a glass substrate.

A magnetic recording medium and a manufacturing method therefor according to the present invention will be described in further detail with reference to some examples of embodiments. However, the examples shall not limit the present invention, and a variety of modifications is possible within the scope and spirit of the invention.

Example 1

A disk shape substrate with 3.5 inch diameter made by injection molding polycarbonate resin was used for a nonmagnetic substrate. After cleaning, the substrate was introduced into a sputtering apparatus, and a ruthenium underlayer 30 nm thick was formed under an argon gas atmosphere of 30 mTorr. Subsequently, a granular magnetic layer 15 nm thick was formed by means of an RF sputtering method using a target of $CO_{88-X}Cr_{12}Pt_X$ containing 10 mol % of $SiO_2$ under an argon gas atmosphere of 15 mTorr. The granular magnetic layers were deposited under the same conditions except that various targets were used containing platinum in proportion x from 10 to 25. After depositing a carbon protective layer 10 nm thick on each of the granular magnetic layers, the resulted article was taken out from the vacuum chamber. After that, liquid lubricant was applied to the thickness of 1.5 nm to produce a magnetic recording medium. Substrate heating prior to the deposition was not conducted.

Figure 2:
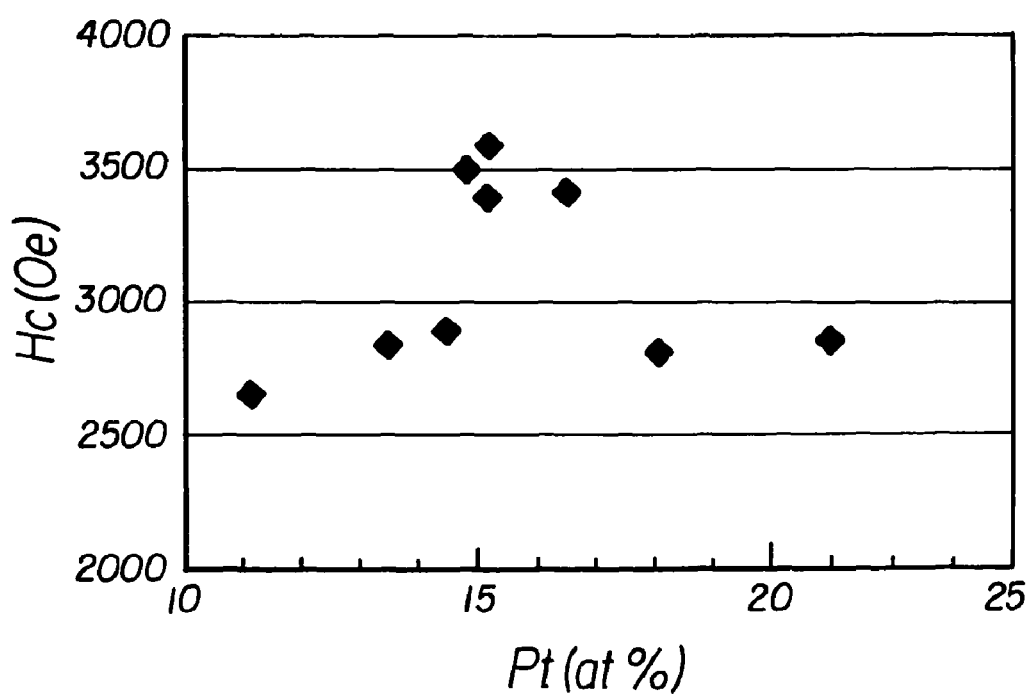
FIG. 2 is a graph showing a relation between platinum concentration in the ferromagnetic crystal grains of a granular magnetic layer and coercive force Hc of a magnetic recording medium.

The thus obtained magnetic recording media, having the structure of FIG. 1 differ from each other in the composition of the granular magnetic layer according to the difference of the target used for the deposition. Quantity of platinum contained in the ferromagnetic crystal grains in the granular magnetic layer of each magnetic recording medium was measured by composition analysis by means of energy dispersion X-ray spectroscopy (EDS). Coercive force Hc of each magnetic recording medium was measured by a vibrating sample magnetometer (VSM). FIG. 2 is a graph showing the relation between platinum concentration in the ferromagnetic crystal grains and coercive force Hc of the magnetic recording medium. The graph clearly shows that the Hc of the medium initially increases with increase of the platinum concentration in the ferromagnetic crystal grains and then decreases in the region of platinum concentration of 18 at % and more. The high coercive force Hc values of about 3,500 [Oe] were attained when the platinum concentration in the ferromagnetic crystal grains was in the range from 15 at % to 17 at %.

Example 2

Figure 3:
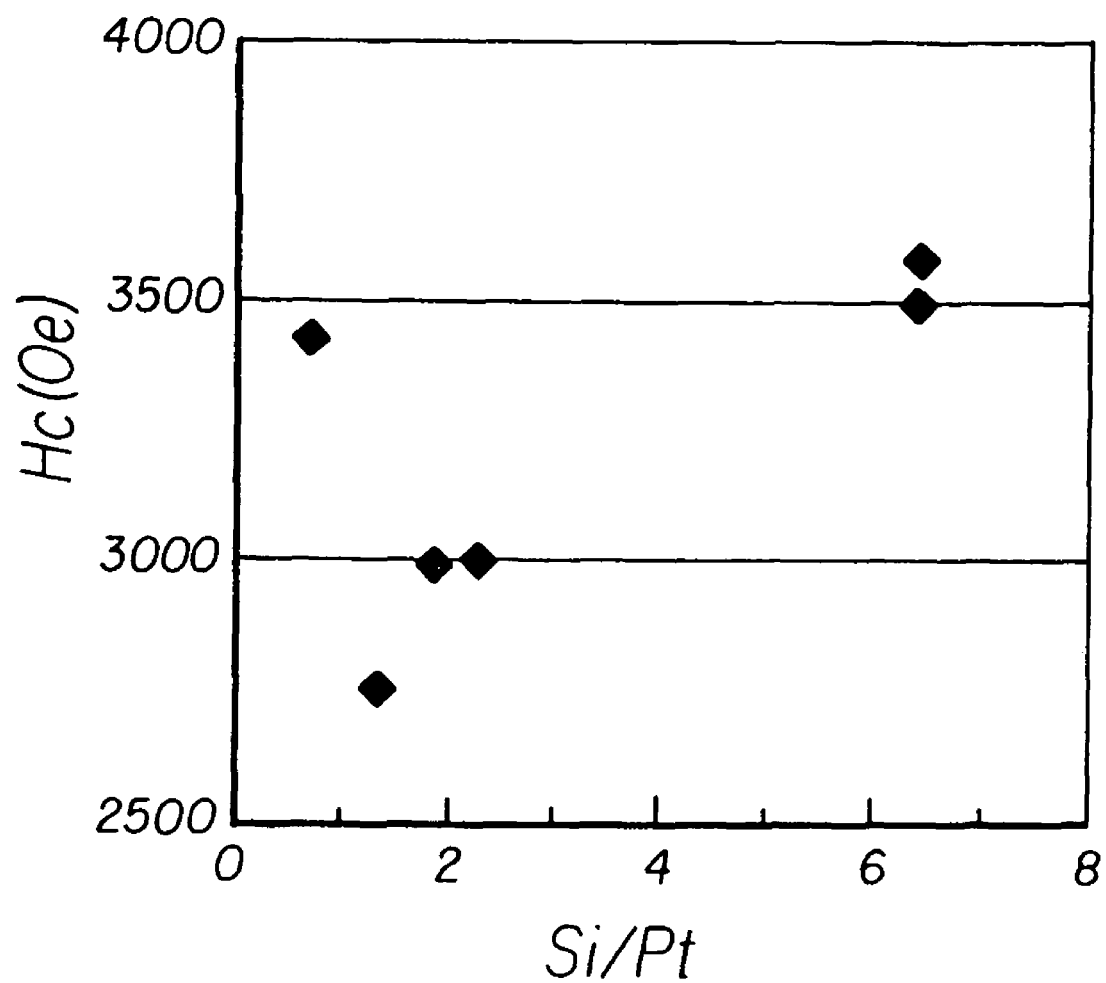
FIG. 3 is a graph showing a relation between Si/Pt atomic ratio in the grain boundary region of a granular magnetic layer and coercive force Hc of a magnetic recording medium.

A plurality of magnetic recording medium was produced in the same manner as in Example 1 except that a granular magnetic layer was deposited using a target of $Co_{76}Cr_{12}Pt_{12}$ containing 10 mol % of $SiO_2$ under deposition conditions different from each other to control the platinum content being in the range of 15 at % to 17 at %. Composition of the grain boundary region in the granular magnetic layer of each of the obtained magnetic recording media was analyzed by means of EDS. FIG. 3 is a graph showing a relation between Si/Pt atomic ratio in the grain boundary region and the coercive force Hc of a magnetic recording medium. The graph of FIG. 3 shows a tendency of the He values in a low level when the Si/Pt atomic ratio is lower than 3, and high coercive force of about 3,500 [Oe] is achieved when the Si/Pt atomic ratio is larger than 6.

However, the coercive force Hc can be occasionally high even if the Si/Pt atomic ratio is low. Accordingly, the effect of the Si/Pt atomic ratio has been further studied in terms of a signal to noise ratio (SNR) at reading and writing in the magnetic recording medium. Two samples of magnetic recording media were prepared and difference in SNR between the two samples was measured at 300 kFCI: sample 2-1 having Si/Pt atomic ratio of 1.8 and coercive force He of 2,980 Oe deposited under gas pressure of 40 mTorr, and sample 2-2 having Si/Pt atomic ratio of 6.4 and coercive force He of 3,503 Oe deposited under gas pressure of 5 mTorr. Measurement of the SNR was made with a spinning stand tester. Writing and reading for the magnetic recording medium was done using a GMR head having a writing track width of 1 µm, a gap length of 0.25 µm, a reading track width of 0.7 µm, and a shield gap length of 0.12 µm. The head flying height was about 20 nm. The results of the SNR measurement are given in Table 1.

TABLE 1

| magnetic recording medium | coercive force Hc [Oe] | Si/Pt atomic ratio (*1) | SNR [dB] |
|---|---|---|---|
| sample 2-1 | 2,980 | 1.8 | 16.9 |
| sample 2-2 | 3,503 | 6.4 | 20.4 |

(*1) in the nonmagnetic grain boundary region

Table 1 indicates that the SNR is better for larger value of the Si/Pt atomic ratio. Accordingly, larger values are favorable for the Si/Pt atomic ratio in the grain boundary region. In particular, the Si/Pt atomic ratio of 6 or more allows attaining high coercive force and low noise.

Example 3

Two recording media were produced in the same manner as in Example 1 except that each granular magnetic layer was formed by means of an RF sputtering method using a target of $Co_{82}Cr_6Pt_{12}$ containing 6 mol % of $SiO_2$ and 2 mol % of $Cr_2O_3$ under an argon gas atmosphere of 40 mTorr for the sample 3-1 or 15 mTorr for the sample 3-2.

Quantity of platinum in the ferromagnetic crystal grains in the granular magnetic layer of each of the obtained magnetic recording media was measured by means of EDS. The measured values of platinum content were 13 at % for the sample 3-1 and 16 at % for the sample 3-2. An Si/Pt atomic ratio in the grain boundary region of each sample was determined from composition analysis for the grain boundary region by means of EDS. Signal to noise ratio (SNR) was also measured for each sample at writing and reading density of 300 kFCI. The SNR was measured using a spinning stand tester. Writing and reading for the magnetic recording medium was done using the same GMR head as in Example 2. The head flying height was again about 20 nm. Results of measurement of the Si/Pt atomic ratio in the grain boundary region and the SNR are given in Table 2.

TABLE 2

| magnetic recording medium | Pt content in grains [at %] (*1) | coercive force Hc [Oe] | Si/Pt atomic ratio (*2) | SNR [dB] |
|---|---|---|---|---|
| sample 3-1 | 13 | 2,805 | 4.0 | 10.5 |
| sample 3-2 | 16 | 3,432 | 6.1 | 11.9 |

(*1) in the ferromagnetic crystal grains
(*2) in the nonmagnetic grain boundary region Table 2 clearly shows that the SNR is better for larger Si/Pt atomic ratio. In particular, high coercive force and low noise can be attained when the Si/Pt atomic ratio is 6 or more.

As described so far, a magnetic recording medium with excellent recording performances is obtained by employing a granular magnetic layer having a composition of a specified platinum content according to the present invention. Such a magnetic recording medium does not need a substrate heating step in the manufacturing process of the medium. Consequently, simplification of the manufacturing process is accomplished and the use of a plastic substrate, which is inexpensive, is possible.

What is claimed is:

1. A magnetic recording medium comprising:
    a nonmagnetic substrate; and
    a plurality of layers sequentially laminated on said substrate including:
    a nonmagnetic underlayer,
    a granular magnetic layer consisting of ferromagnetic crystal grains containing at least cobalt and platinum, and nonmagnetic grain boundary region that contains an oxide or nitride surrounding said ferromagnetic crystal grains, wherein said nonmagnetic grain boundary region contains more than 1 at % of platinum and up to 10 at % of platinum,
    a protective film, and
    a liquid lubrication layer.

2. A magnetic recording medium according to claim 1, wherein said protective film is a carbon film.

3. A magnetic recording medium according to claim 2, wherein said protective film is at least 10 nm thick.

* * * * *